Oct. 29, 1957  J. A. TROENDLE  2,811,320
DIFFERENTIAL CONTROL
Filed March 16, 1953  2 Sheets-Sheet 1

INVENTOR.
JEAN A. TROENDLE
BY
James B. Christie
ATTORNEY

Oct. 29, 1957  J. A. TROENDLE  2,811,320
DIFFERENTIAL CONTROL
Filed March 16, 1953  2 Sheets-Sheet 2

INVENTOR.
JEAN A. TROENDLE
BY
James B. Christie
ATTORNEY

United States Patent Office 2,811,320
Patented Oct. 29, 1957

2,811,320

DIFFERENTIAL CONTROL

Jean A. Troendle, Hollywood, Calif.

Application March 16, 1953, Serial No. 342,489

10 Claims. (Cl. 242—75.47)

This invention relates to differential clutches and particularly to apparatus for providing a control action if the speed of one rotatable member exceeds that of another.

In high speed apparatus, such as paper drive arrangements for recording oscillographs, in which a flexible substance is unrolled from one spool onto another spool, it is necessary to control the rotation of the spool from which the substance is unrolled. This is particularly true under stopping conditions in order to prevent an excessive amount of the substance from being unrolled due to the inertia of the spool from which it is unrolled. Since the flexible substance will not act upon the spool from which it is unwound to provide the required braking action, some control is necessary.

It is ordinarily impractical to synchronize the speed of rotation of the two spools because the effective diameters of the two spools change as the substance is wound from one to the other.

In low speed arrangements, sufficient control can ordinarily be effected by providing a constant drag or braking action upon the spool from which the substance is unrolled. However, at high speeds this is not practical because the required braking action is so high that the substance would be torn or broken during the normal unrolling action.

I have developed a differential control which is particularly suitable for controlling the rotation of a spool from which a substance such as paper is unrolled by a driven spool. The control is essentially a differential clutch which actuates a brake on the spool from which the substance is unrolled when the speed of rotation of the driven spool exceeds that of the prime mover. The driven spool is coupled to the rotatable shaft of a prime mover through a flexible coupling, and under stopping conditions the speed of the driven spool exceeds that of the prime mover due to the inertia of the driven spool. This speed differential is employed to control the action of the differential clutch which in turn controls the braking action on the spool from which the substance is unwound.

The differential clutch comprises a helical spring which extends between the driven spool and the shaft of the prime mover. A rotatable member is located around the helical spring and it is provided with an annular inner surface which is spaced slightly from the spring when the spring is not under torsion. When the spring is under torsion due to movement of the driven spool at a higher speed than that of the shaft of the prime mover, the spring expands so that its outer periphery engages the inner surface of the rotatable member and causes it to move at the same speed as that of the driven spool. Preferably a friction clutch is disposed around the outer periphery of the rotatable member, and the torsion which is transmitted through this clutch is employed to control the action of the brake on the spool from which the substance is unrolled.

The invention is explained with reference to the drawings, in which.

Figure 2:
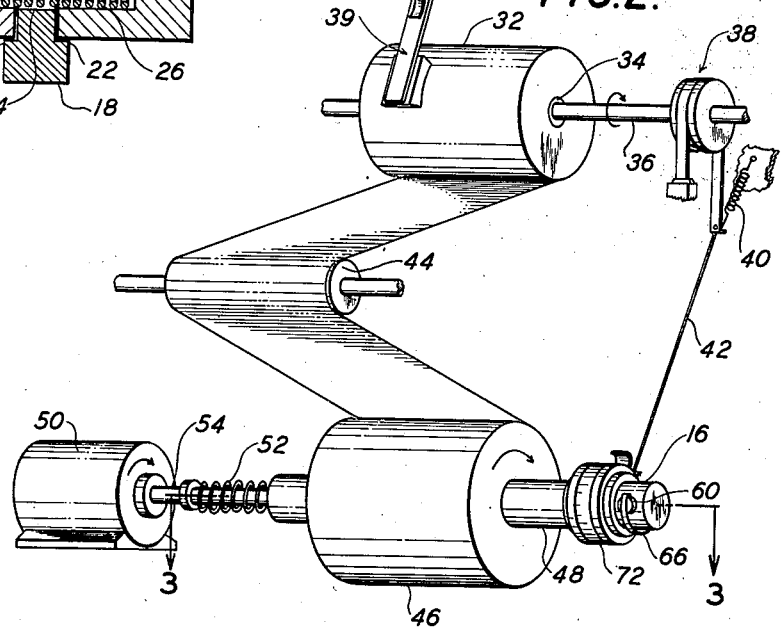
Fig. 2 shows how the differential clutch may be employed as a control in the paper drive for a recording oscillograph.
Figure 3:
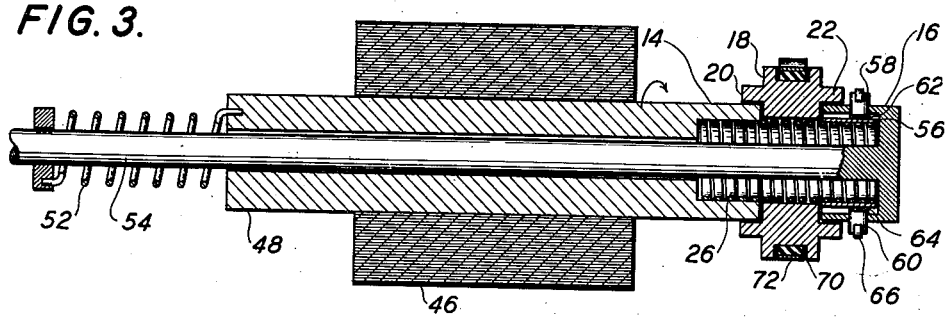
Figure 4:
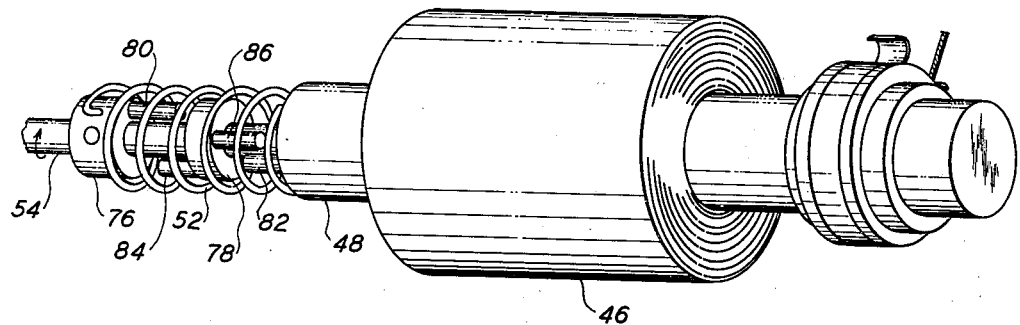
Figure 5:
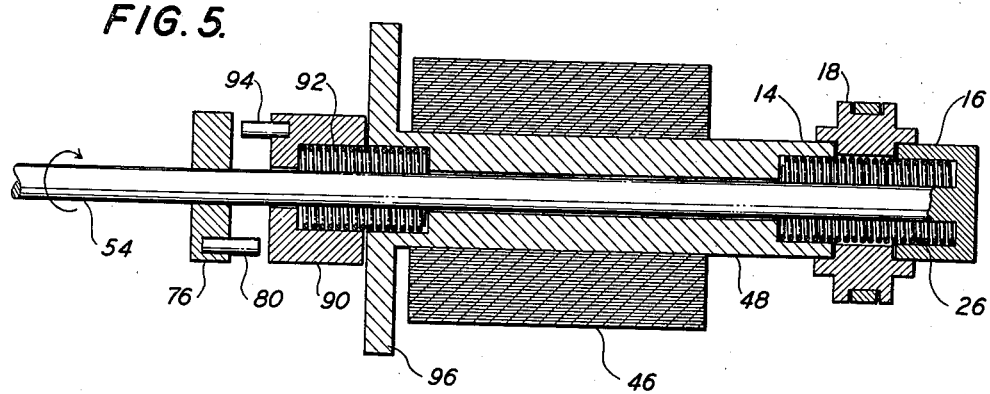

Fig. 3 is a sectional view along line 3—3 of Fig. 2; and Figs. 4 and 5 illustrate modifications of the paper drive arrangement of Figs. 2 and 3.

Figure 1:
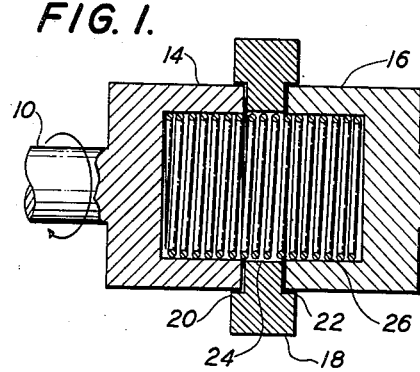
Fig. 1 is a sectional view showing the differential clutch of my invention.

Fig. 1 shows the differential clutch located between two rotatable shafts 10 and 12. These shafts may be driven by any suitable source of power and should rotate in the same direction. A pair of drums 14 and 16 are carried by the shafts 10 and 12, and the drums have cylindrical openings which are axially aligned with one another.

An annular member 18 is located between the two drums, and it is provided with bearings 20 and 22 which ride on the outer periphery of the two drums. The annular member 18 is provided with a cylindrical inner surface 24 having a diameter which is slightly greater than the diameter of the cylindrical openings in the drums 14 and 16.

A helical spring 26 extends through the member 18 and into the cylindrical openings in the drums 14 and 16. Preferably the outer diameter of the spring 26 is slightly greater than the diameter of the cylindrical openings in the drums 14 and 16. Thus, the spring 26 is mounted in friction contact with the cylindrical openings of the two drums.

The helical spring 26 may be wound in either direction. In Fig. 1, the spring 26 is wound clockwise as viewed from the shaft 10. If a counter clockwise winding is employed, the clutch functions in the same manner except that the clutch action is reversed.

When the shafts 10 and 12 are at rest, or when they are rotating at the same speed, the spring 26 is not under torsion and hence its outer periphery does not engage the inner surface 24 of the member 18. If the shaft 12 rotates at a slower speed than that of the shaft 10, the spring 26 tends to wind up slightly and it still does not engage the surface 24 of the member 18. However, if the shaft 10 rotates at a slower speed than that of the shaft 12, the spring 26 is caused to be under torsion and it tends to unwind. The portions of the spring 26 which are located within the drums 14 and 16 are confined by the drums, but the portion of the spring 26 which is located inside the member 18 expands so that its outer periphery engages the surface 24 of the member 18. If the shaft 12 rotates at a speed which is substantially higher than the shaft 10, the spring 26 expands to such an extent that it locks the member 18 to the shaft 12. The friction contact between the spring 26 and the drum 14 which is rotating at the lowest speed provides sufficient slippage to prevent the spring 26 from being damaged.

Figs. 2 and 3 illustrate the way in which a differential clutch of the type shown in Fig. 1 may be employed as a control in the paper drive for an oscillograph. A roll 32 of paper to be unwound is mounted on a spool 34, which in turn is mounted on a rotatable shaft 36. Preferably the shaft 36 is freely rotatable except for the action of a brake 38 which is connected to one end of the shaft and a drag brake 39 which engages the outer periphery of the roll 32. A spring 40 is provided for de-loading the brake except when a substantial force is applied through a cable 42 which interconnects the brake and the differential clutch.

The paper passes over a speed metering roller 44 and it is wound onto a roll 46 which is located on a spool 48. The spool 48 is driven by a motor 50 through a torsion spring 52 which interconnects the shaft 54 of the motor and the spool 48.

The drum 14 is located at one end of the spool 48, and the drum 16 is attached to the end of the shaft 54 with the shaft 54 extending concentrically inside the drum. As before, the member 18 is located between the drums 14 and 16 and it is provided with bearings 20, 22 which ride on the outer periphery of the two drums. A helical spring 26 constructed of flat material is illustrated in this embodiment of the invention. I prefer this construction for the spring 26; however, the construction illustrated in Fig. 1 may be employed if desired. The spring 26 of Fig. 3 is wound counterclockwise as viewed from the spool 48.

In order to allow the spring 52 to act on the spool 46 and the brake control 42, I prefer to provide an annular steel member 56 inside the drum 16. The inner diameter of the annular member 56 is slightly smaller than the outer diameter of the spring 26 when it is not under torsion. A pair of steel pistons 58 and 60 extend through the drum 16, and they are provided with cork tips 62 and 64 for acting by friction on the outer periphery of the member 56. A spring 66 serves to force the pistons 58, 60 inwardly so that their cork tips engage the member 56. Thus, the drum 16 engages the outer periphery of the spring 26 through the pistons 58, 60 and the annular member 56, yet the cork tips 62, 64 permit the spring 26 to rotate with respect to the drum 16 when the spring 26 becomes locked in the drum 14.

Various types of couplings may be employed between the member 18 and the brake 38; however, I prefer the arrangement illustrated in Figs. 2 and 3. The member 18 is of annular shape and its outer periphery is provided with an annular groove in which a friction clutch 70 is located. A steel spring 72 which extends around the clutch 70 provides a spring load on the clutch.

In operation, when the motor 50 is turned on it causes the shaft 54 to rotate, and the torsion spring 52 causes the drum 48 to rotate. The torsion spring 52 serves as a flexible coupling between the rotatable shaft 54 of the motor and the spool 48. Hence during starting, the shaft 54 turns slightly faster than the spool 48 due to the flexibility of the torsion spring 52. This causes the drum 16 to rotate slightly faster than the drum 14, but this tends to cause the spring 26 to contract and hence the spring does not engage the member 18. Also, under normal operating conditions while the paper is being unwound from the roll 32 onto the roll 46, the spool 48 and the shaft 54 rotate at substantially the same speed and hence the spring 26 does not actuate the member 18.

However, when the motor 50 begins to stop, the spool 48 moves slightly faster than the shaft 54 due to the flexibility of the torsion spring 52. This causes the helical spring 26 to expand slightly and engage the inner surface of the member 18 so that the member 18 rotates at substantially the same speed as the spool 48. The expansion of the spring 26 ordinarily locks the member 18 to the drum 14 in the spool 48 and the spring 26 rotates with respect to the drum 16 due to the friction contact between the cork tips 62, 64 and the member 56 around the spring. The play provided by the torsion spring 52 serves to release the spring inside the member 18 when the motor is started again.

The member 56 and the pistons 58, 60 may be omitted and the inner surface of the drum 16 may be employed to provide a friction contact with the spring 26, as illustrated in Fig. 1 if desired. However, such an arrangement is not as good as the arrangement of Fig. 3 because we lose the advantage of using the effect of spring 52 to wind up the paper given by the spool 32 between the starting of operation of the brake 38 and the complete stoppage of the spool 32.

Fig. 4 illustrates an arrangement for limiting the play provided by the torsion spring 52. Such an arrangement is desirable in order to prevent any irregularity in the mechanism from creating a differential speed between the shaft 54 and the spool 48 through the spring 52 and thereby inadvertently actuating the differential system and the brake.

The spring 52 has one end affixed to a hub 76 which in turn is affixed to the shaft 54. The other end of the spring 52 is affixed to the spool 48. A hub 78 which floats on the shaft 54 is located between the hub 76 and the spool 48. Pins 80 and 82 are located on the hub 76 and the spool 48 respectively. A pair of pins 84, 86 is provided on the floating hub 78.

The hub and pin arrangement illustrated in Fig. 4 serves to limit the difference in the movement between the shaft 54 and the drum 48 to slightly less than two revolutions. The flexible coupling provided by the spring 52 is required to provide differential movement between the shaft 54 and the spool 48 only upon starting and stopping the paper drive. The hub and pin arrangement provides sufficient flexibility in the coupling, yet it prevents the torsion spring 52 from acting on the brake during normal running. When the paper drive has attained its operating speed, there is a direct drive between the shaft 54 and the spool 48 through the pins 80, 82, 84 and 86.

If a different amount of play is desired, it will be apparent that a different number of hubs and pins may be employed in conjunction with the torsion spring 52.

Fig. 5 illustrates another type flexible coupling between the shaft 54 and the spool 48. In this arrangement, a hub 76 carrying a pin 80 is affixed to the shaft 54. A drum 90 is mounted to float on the shaft 54 between the hub 76 and the spool 48. The spool 48 is provided with a hollow cylindrical portion which is aligned with a corresponding hollow cylindrical portion in the drum 90. A helical spring 92 is located inside these two cylindrical portions and mounted in friction contact therewith so as to provide an overrunning clutch between the drum 90 and the spool 48. A pin 94 is provided on the drum 90 for engaging the pin 80 so as to limit the play in the coupling between the shaft 54 and the drum 90.

Preferably the spool 48 is provided with a fly wheel 96 so that the spool 48 will have enough inertia to provide the required differential movement between the drums 14 and 16 of the differential clutch.

In this embodiment of the invention, the play required on starting is provided by the pins 80 and 94, and the coupling between the drum 90 and the spool 48 through the spring 92 is substantially a direct drive due to the direction of winding of the spring 92. On stopping, the required flexibility is provided by the spring 92 which is wound to provide a slipping action whenever the drum 48 tends to rotate faster than the shaft 54.

It will be apparent that flexible couplings of various types may be employed between the shaft 54 and the spool 48, so long as the coupling is arranged to provide the required differential movement on starting and stopping the paper drive.

Also, it will be apparent that the control apparatus of my invention may be employed to control the unwinding of substantially any flexible substance, such as thread, cloth, tape, etc., in addition to paper.

I claim:

1. Apparatus for controlling the rotation of a first spool from which a substance is unwound onto a second spool, comprising a rotatable member adapted to be coupled to a source of power, a flexible coupling interconnecting the rotatable member and the second spool, and means coupled to and actuated by the flexible coupling for providing a braking action on the first spool which varies with variations of the speed of the second spool with respect to the speed of the rotatable member.

2. In combination, a first rotatable spool, a brake for controlling the speed of rotation of the first spool, a second rotatable spool adapted to unwind a substance from the first spool, a rotatable member coupled to a source of power, a flexible coupling interconnecting the rotatable member and the second spool, and means coupled to and actuated by the flexible coupling and responsive to variations of the speed of the second spool with respect to the speed of the rotatable member for controlling the action of the brake on the first spool.

3. In combination, a first rotatable spool, a brake for controlling the speed of rotation of the first spool, a second rotatable spool adapted to unwind a substance from the first spool, a rotatable member coupled to a source of power, a flexible coupling interconnecting the rotatable member and the second spool, and means coupled to and controlled by the flexible coupling for actuating the brake on the first spool when the speed of rotation of the second spool exceeds that of the rotatable member.

4. In combination, a first rotatable spool, a brake for controlling the speed of rotation of the first spool, a second rotatable spool adapted to unwind a substance from the first spool, a rotatable member coupled to a source of power, a flexible coupling interconnecting the rotatable member and the second spool, a helical spring disposed between the rotatable member and the second spool, a control member having a cylindrical inner surface disposed around the helical spring so that the diameter of the spring increases and the outer periphery of the spring engages said inner surface when the speed of rotation of the second spool exceeds that of the rotatable member, and means interconnecting the control member and the brake for controlling the action of the brake in accordance with movement of the control member.

5. In combination, a first rotatable spool, a brake for controlling the speed of rotation of the first spool, a second rotatable spool adapted to unwind a substance from the first spool, a rotatable member coupled to a source of power, a flexible coupling interconnecting the rotatable member and the second spool, a helical spring supported in friction contact with the rotatable member and the second spool, an annular member having a cylindrical inner surface disposed around the helical spring so that the outer periphery of the spring engages said inner surface when the diameter of the spring increases due to a difference in the speed of rotation of the second spool with respect to the rotatable member, a friction clutch located on the outer periphery of the annular member, and means interconnecting the friction clutch and the brake for controlling the action of the brake in accordance with the torque transmitted through the friction clutch.

6. The apparatus of claim 5, wherein the flexible coupling comprises a torsion spring interconnecting the rotatable member and the second spool.

7. The apparatus of claim 5, wherein the flexible coupling comprises a spring interconnecting the rotatable member and the second spool, and further including means for limiting the maximum play in the flexible coupling.

8. Apparatus for controlling the rotation of a first spool from which a substance is unwound onto a second spool, comprising a brake for the first spool, a rotatable shaft, a flexible coupling interconnecting the shaft and the second spool, a pair of members having axially aligned cylindrical openings therein, one of the members being coupled to the rotatable shaft and the other being coupled to the second spool, a third member located between said pair of members and having a cylindrical inner surface which is concentric with the cylindrical openings in said pair of members, a helical spring extending through the third member and into the openings in each of said pair of members, the inner diameter of the openings in the pair of members being slightly less than the diameter of the cylindrical inner surface of the third member and substantially equal to the outer diameter of the spring, and means coupled between the third member and the brake for controlling the brake with movement of the third member.

9. The method of controlling the rotation of a first spool from which a substance is unwound onto a second spool which comprises driving the second spool with a flexible coupling connected to a rotatable member, and providing a braking action on the first spool which is responsive to the action of the flexible coupling and which varies with variations of the speed of the second spool with respect to the speed of the rotatable member.

10. The method of controlling the rotation of a first spool from which a substance is unwound onto a second spool which comprises driving the second spool through a flexible coupling which in turn is driven by a rotatable member, and controlling the rotation of the first spool in response to the action of the flexible coupling to control its rotation in accordance with variations of the speed of the second spool with respect to the speed of the rotatable member.

References Cited in the file of this patent

UNITED STATES PATENTS

| | | |
|---|---|---|
| 2,034,543 | Twiss et al. | Mar. 17, 1936 |
| 2,059,879 | La Pierre | Nov. 3, 1936 |
| 2,231,279 | Miron | Feb. 11, 1941 |
| 2,412,440 | Bruestle | Dec. 10, 1946 |
| 2,551,739 | Harlan | May 8, 1951 |
| 2,566,539 | Starkey | Sept. 4, 1951 |
| 2,571,232 | Gorske | Oct. 16, 1951 |
| 2,638,794 | Knoblock | May 19, 1953 |
| 2,638,795 | King | May 19, 1953 |